No. 837,619. PATENTED DEC. 4, 1906.
J. GLANZBERG.
MEAT BROILER.
APPLICATION FILED JULY 14, 1905.
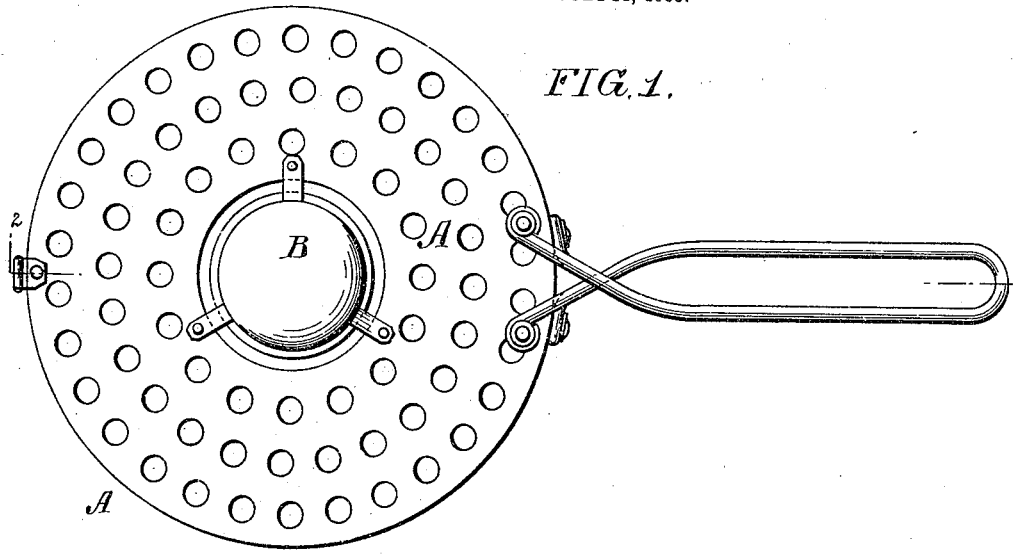
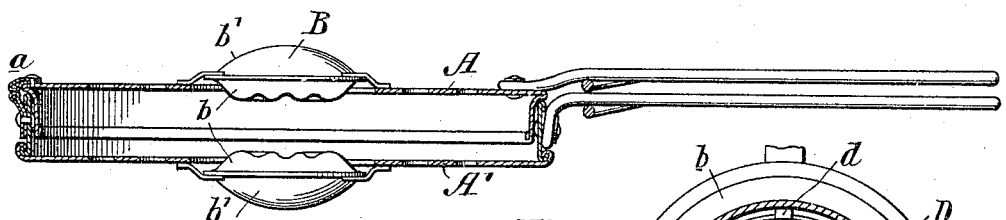
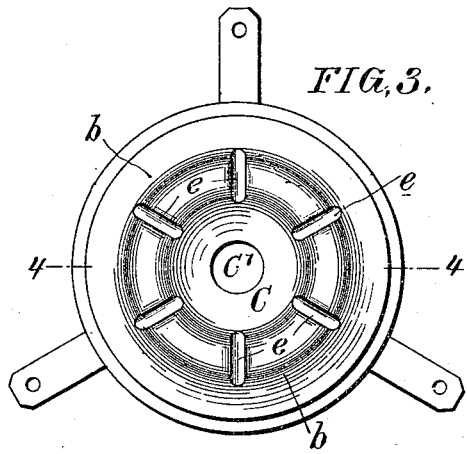
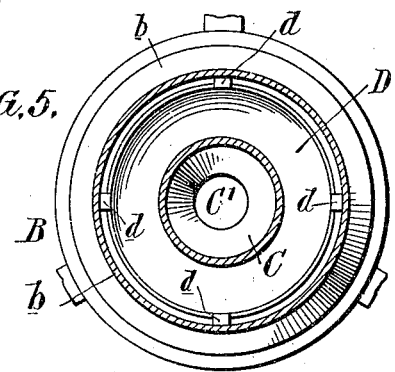
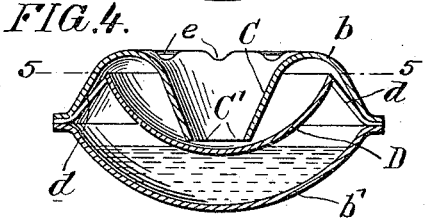
WITNESSES
INVENTOR
Julius Glanzberg
BY
ATTORNEY

UNITED STATES PATENT OFFICE.

JULIUS GLANZBERG, OF PHILADELPHIA, PENNSYLVANIA.

MEAT-BROILER.

No. 837,619. Specification of Letters Patent. Patented Dec. 4, 1906.

Application filed July 14, 1905. Serial No. 269,617.

*To all whom it may concern:*

Be it known that I, JULIUS GLANZBERG, a citizen of the United States, residing at Philadelphia, in the county of Philadelphia and State of Pennsylvania, have invented certain new and useful Improvements in Meat-Broilers, of which the following is a specification.

My invention relates to improvements in meat-broilers; and the object of my invention is to provide a receptacle in said broiler to contain water, so that during the broiling of the meat the water will vaporize and penetrate the meat, keeping it moist and preventing the meat from contracting and becoming dry and hard or burning or scorching. The water also acts as a purifier in absorbing the gases from the fire, which tend to give the meat an unpleasant flavor.

Referring to the drawings, Figure 1 is a plan view of an ordinary meat-broiler, showing my invention embodied therein. Fig. 2 is a sectional view as on line 2 2, Fig. 1. Fig. 3 is a detached view of the receptacle looking at the inner face of the same. Fig. 4 is a vertical section of the receptacle as on line 4 4, Fig. 3; and Fig. 5 is a horizontal section as on line 5 5, Fig. 4.

In the drawings, A and A' represent the two members of a broiler hinged together at $a$, between which members is placed the meat to be broiled. Located near the center of each member A and A' is a receptacle B, adapted to contain water. Said receptacle is so constructed that the broiler may be turned over to complete the broiling process without the water running out of the same.

The receptacle B consists of two parts $b$ and $b'$, tightly secured together. The part $b$ of the receptacle has an inwardly-projecting conical neck C, extending to the middle of the receptacle, and is provided with an aperture C', through which it may be filled with water and the steam allowed to escape to the meat. By having the neck projecting inwardly to the center the receptacle may be turned either side up without letting the water run out of the same.

To prevent the meat adhering too closely to the part $b$ and closing the neck, I provide corrugations $e$ in the said part $b$, so that the steam will not be confined in the receptacle.

When the broiler is placed over a very hot fire, the tendency is for the water in the receptacle to vaporize too rapidly and boil over, forcing the water out through the aperture. To prevent this, I provide a partition D, which is curved so that its edges extend near the part $b$ of the receptacle, so that the water cannot boil through the aperture C' without first overflowing the edges of the partition D, although the steam and moisture may readily escape through the aperture C', leaving the water in the receptacle to vaporize gradually. The partition D is suspended by arms $d$, which are secured between the parts $b$ and $b'$ of the receptacle.

It will be understood that a water-receptacle may be applied to any style of broiler without departing from my invention. In large broilers having parallel bars several water-receptacles may be used, if so desired.

Having thus described my invention, I claim and desire to secure by Letters Patent—

1. In a meat-broiler, the combination of a broiling member to receive the meat, a water-receptacle having an aperture formed therein, said water-receptacle located in said broiling member so as to form part of the broiling-surface of the same, substantially as described.

2. In a meat-broiler, the combination of broiling members hinged together, a water-receptacle carried by each of said broiling members, said water-receptacle located in the central part of said broiling members, substantially as described.

3. In a meat-broiler, the combination of a broiling member, a water-receptacle forming part of the broiling-surface of said broiling member, said water-receptacle having an inwardly-projecting neck, and an aperture formed in said neck, substantially as described.

4. In a meat-broiler, the combination of a broiling member, a water-receptacle located adjacent the broiling-surface of said broiling member, said water-receptacle having an aperture formed therein, and corrugations formed in the surface of said receptacle to prevent the closing of the aperture in the said receptacle, substantially as described.

5. In a meat-broiler, the combination, of a broiling member, a water-receptacle located adjacent the broiling-surface of said broiling ember, said receptacle having an inwardly-projecting neck, and a partition located within said receptacle to partially obstruct the aperture in the said receptacle, substantially as described.

In testimony whereof I affix my signature in presence of two witnesses.

JULIUS GLANZBERG.

Witnesses:
 DAVID SCHERMER,
 ISIDOR SCHERMER.